(12) United States Patent
Dean et al.

(10) Patent No.: US 9,026,129 B2
(45) Date of Patent: May 5, 2015

(54) SYSTEMS AND METHODS FOR LOCATING A MOBILE DEVICE

(75) Inventors: Richard F. Dean, Lyons, CO (US);
Kenneth R. Baker, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1933 days.

(21) Appl. No.: 11/960,584

(22) Filed: Dec. 19, 2007

(65) Prior Publication Data
US 2009/0163224 A1    Jun. 25, 2009

(51) Int. Cl.
*H04W 24/00*    (2009.01)
*G01S 5/14*    (2006.01)
*G01S 5/02*    (2010.01)

(52) U.S. Cl.
CPC .............. *G01S 5/14* (2013.01); *G01S 5/0226* (2013.01); *G01S 5/0273* (2013.01)

(58) Field of Classification Search
CPC ...... H04W 4/02; H04W 64/00; G01S 5/0226; G01S 5/0273; G01S 5/14
USPC ........... 455/404.2, 456.1–457, 13.2; 370/316, 370/320, 335
See application file for complete search history.

(56) References Cited

U.S. PATENT DOCUMENTS

| | | |
|---|---|---|
| 7,139,580 B2 | 11/2006 | Stein et al. |
| 7,194,275 B2 | 3/2007 | Bolin et al. |
| 2003/0008663 A1 | 1/2003 | Stein et al. |
| 2003/0008669 A1* | 1/2003 | Stein et al. ............. 455/456 |
| 2004/0203864 A1* | 10/2004 | DiBuduo ............ 455/456.1 |
| 2004/0203911 A1* | 10/2004 | Masuda et al. ......... 455/456.1 |
| 2004/0266459 A1* | 12/2004 | Lee ........................ 455/456.6 |
| 2005/0113117 A1* | 5/2005 | Bolin et al. ............ 455/456.6 |
| 2006/0025158 A1* | 2/2006 | Leblanc et al. ......... 455/456.2 |
| 2007/0229355 A1* | 10/2007 | Han et al. ............... 342/419 |

FOREIGN PATENT DOCUMENTS

| | | |
|---|---|---|
| CA | 2368279 A1 | 10/2000 |
| CN | 1152356 A | 6/1997 |
| EP | 1166587 | 4/2007 |
| JP | 2003035762 A | 2/2003 |
| JP | 2007534213 A | 11/2007 |
| KR | 20050092943 A | 9/2005 |
| RU | 2127963 C1 | 3/1999 |

(Continued)

OTHER PUBLICATIONS

International Search Report and Written Opinion—PCT/US2008/087540—ISA/EPO—May 25, 2009.

(Continued)

*Primary Examiner* — George Eng
*Assistant Examiner* — Marcus Hammonds
(74) *Attorney, Agent, or Firm* — Linda G. Gunderson; Thomas A. Jolly (57) ABSTRACT

Systems and methods disclosed herein generate pseudo pilot signals including PN phase offsets corresponding to a plurality of pseudo base stations. The pseudo base stations are (1) a plurality of non-physical base stations, and/or (2) physical base stations outside the reception range of the mobile device. The pseudo pilot signals are combined with communication signals from a physical base station to form a series of composite signals. The composite signals are transmitted for reception by a wireless mobile device and are used to determine the location of the mobile device.

26 Claims, 7 Drawing Sheets

(56) References Cited

FOREIGN PATENT DOCUMENTS

| | | |
|---|---|---|
| TW | I303320 B | 11/2008 |
| WO | WO9635958 A1 | 11/1996 |
| WO | 2005032202 A1 | 4/2005 |
| WO | WO2005088336 | 9/2005 |

OTHER PUBLICATIONS

Taiwan Search Report—TW097149936—TIPO—Jun. 13, 2012.

* cited by examiner

SYSTEMS AND METHODS FOR LOCATING A MOBILE DEVICE

BACKGROUND

1. Field

This disclosure generally relates to use of telecommunications signals to determine the location of a remote device. More specifically, the disclosure pertains to systems and methods for determining the location of a mobile communication device using multiple pilot signals.

2. Background

Today, telecommunication signals are commonly transmitted using cellular systems. Cellular systems comprise groups of cellular base stations, each of which is used to transmit signals to and receive signals from a mobile device, such as a cellular telephone, laptop computer or other such mobile device. In addition to transmitting a variety of voice and/or data signals between the mobile device and the base station, cellular system are often used to locate such mobile devices, both for emergencies and non-emergencies. For example, in the case of a call to the emergency number 911, it is frequently helpful to determine the location of the caller so that assistance can be dispatched to the caller immediately and without requiring that the caller know his/her location. In non-emergency cases, it is frequently desirable to determine the location of a mobile device to provide services such as roadside assistance, turn-by-turn driving directions, concierge services, location-specific billing rates and location-specific advertising, among others.

The CDMA protocol operates using a variety of channels. A Forward CDMA channel carries user and signaling traffic, a pilot signal, and overhead information, from a base station to a mobile device. The pilot and overhead signals establish the system timing and station identity. The pilot channel also provides a signal strength reference that is used in the mobile-assisted handoff (MAHO) process. All base stations have the same pilot waveform and are distinguished from one another only by the phase of the pilot signal.

In current systems, pilot phases are assigned to stations in multiples of 64 chips, giving a total of 512 possible assignments. A number referred to as the Pilot Offset identifies the pilot phase assignment. Different base stations are identified by different pilot pseudonoise (PN) sequence offsets.

Various techniques have been used to determine the location of a mobile device. For example, the Global Positioning System (GPS) is a satellite system that provides users equipped with a GPS receiver the ability to determine their location anywhere in the world. A GPS receiver normally determines its location by measuring the relative times of arrival of signals transmitted simultaneously from multiple GPS satellites.

Another well-known position location technique is Advanced Forward Link Trilateration (AFLT). The AFLT technique is based on measuring time-of-arrival differences between terrestrial base station pilot signals. In the case of a CDMA wireless network, these measurements are called pilot phase measurements. Whenever the mobile device is able to detect signals from a sufficient number of different base station locations, one of which is likely to be the serving base station, the mobile device's position can be determined with a certain accuracy.

It is possible that at a particular location, the mobile device is neither able to detect signals from at least four GPS satellites, or to detect signals from a sufficient number of positioning satellites or base stations. Position determination capability is compromised at these locations.

SUMMARY

Systems, apparatuses, and methods disclosed herein generate pseudo pilot signals including PN phase offsets corresponding to either or both of (1) a plurality of virtual, non-physical base stations, and (2) physical base stations from which communication signals are not being received by a repeater or a mobile device in the vicinity of the mobile device. The pseudo pilot signals are combined with communication signals from a physical base station to form composite signals. The composite signals are transmitted for reception by a wireless mobile device and are used to determine the location of the mobile device.

In some aspects, a pilot generator circuit is configured to communicate with a mobile device in a building or other venue. The pilot generator circuit is operable to generate a set of pseudo pilot signals of known relative PN phase offset and transmit the pseudo pilot signals to the mobile device. The pseudo pilot signals correspond to respective non-physical base stations and/or to physical base stations from which communication signals are not being received.

In other aspects, pseudo pilot signals with PN phase offsets are generated corresponding to a plurality of different non-physical base stations and/or to physical base stations from which communication signals are not being received. Locations of the pseudo base stations are selected to enable trilateration techniques to be used to determine a location of a wireless mobile device that receives the pseudo pilot signals. The pseudo pilot signals are combined with communication signals from a physical base station to form a series of composite signals. The composite signals are output for transmission to the wireless mobile device.

DETAILED DESCRIPTION

The nature, objectives, and advantages of the disclosed method and apparatus will become more apparent to those skilled in the art after considering the following detailed description in connection with the accompanying drawings.

Figure 1:
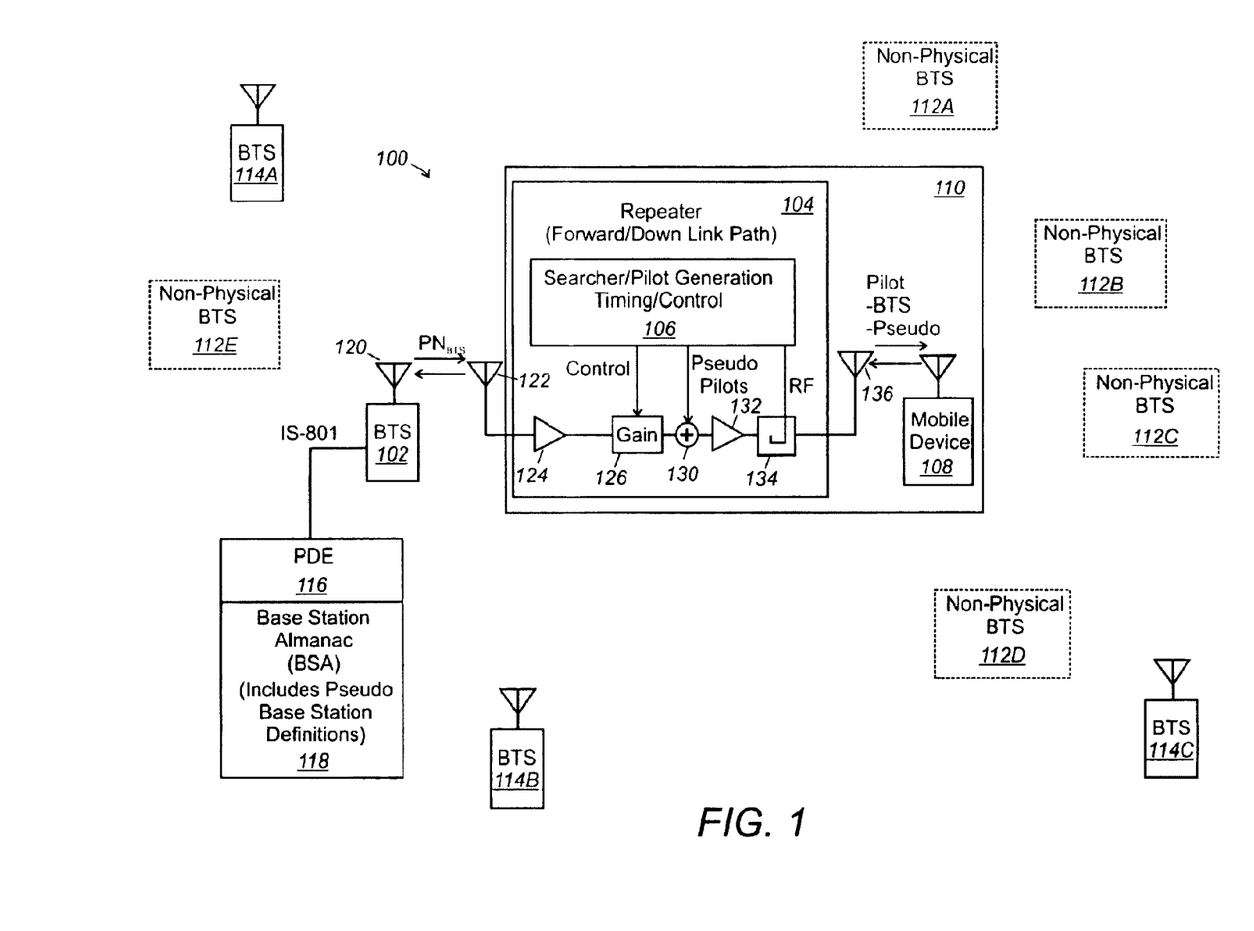
FIG. 1 is a simplified block diagram of a communication network of the disclosed systems and methods.

FIG. 1 illustrates, in block diagram form, a communication network 100 including a variety of components such as one or more base stations 102 configured to communicate with repeater 104; repeater 104 with searcher, pilot generator, and timing control circuit (SPTC circuit) 106 configured to communicate with mobile device 108 in building 110; and position determining entity (PDE) 116 configured to communicate with mobile device 108. In systems and methods described herein, SPTC circuit 106 or other suitable device can generate a set of artificial pilot signals (also referred to as "pseudo pilots") of known relative PN phase offset that are broadcast in a particular geographic vicinity, such as building 110 or other venue. Although SPTC circuit 106 is shown as part of repeater 104 in FIG. 1, it is anticipated that the function of generating the pseudo pilots may be implemented in a stand-alone piece of equipment or as part of other equipment besides repeater 104 and SPTC circuit 106 in communication network 100.

Pseudo pilot signals may correspond to respective pseudo base stations. As used herein, the term "pseudo base station" refers to either (1) a non-physical base station 112A-112E, or (2) a physical base station 114A-114C from which communication signals are outside the reception range of repeater 104 and mobile device 108. Pseudo pilot signals enable the location of building 110 or other venue where mobile device 108 is operating to be determined using trilateration or other location determining techniques that typically require pilot signals from multiple different base stations. Such systems and methods are particularly useful in buildings, structures, or other venues that do not receive a sufficient number of pilot signals or do not receive pilot signals with sufficient strength from physical base stations 102, 114A-C to use trilateration techniques to produce an accurate position location.

Figure 2:
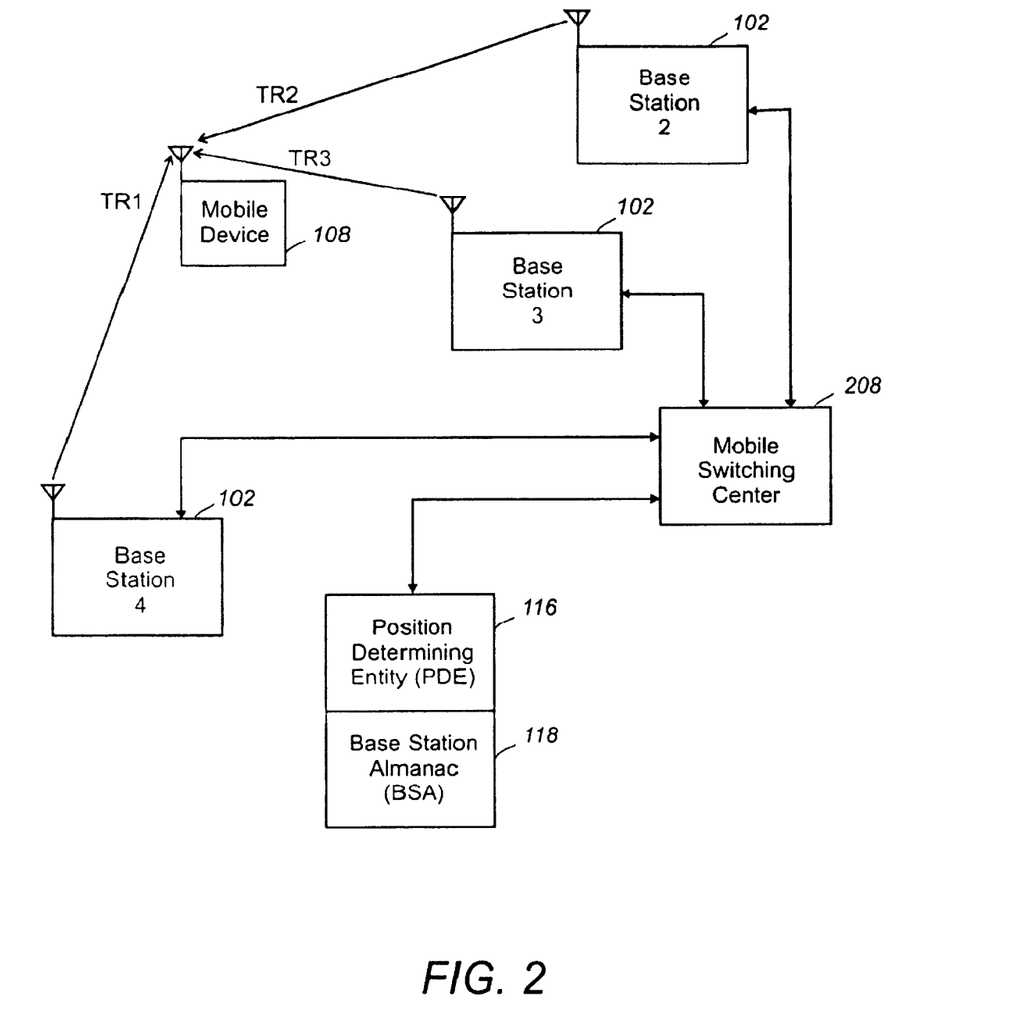
FIG. 2 is a diagram of a conventional communication system.

Referring to a diagram of a conventional communication system 200 shown in FIG. 2, a technique referred to as Advanced Forward Link Trilateration (AFLT) can be used to determine the position of mobile device 108. The AFLT technique is based on measuring time-of-arrival differences between signals from base stations 102. The position of the mobile device 108 can be determined whenever the mobile device 108 is able to detect signals from a sufficient number of different base station locations. The mobile device 108 measures CDMA PN phase offset times of reception (TR1, TR2, and TR3) of different pilot phase noise signals from base stations 102 and reports them to position determination entity (PDE) 116. This timing data may then be used to compute the position of the mobile device 108. Such computation may be done at the mobile device 108, or at PDE 116 if the timing information obtained by the mobile device 108 is transmitted to PDE 116 via a communication link. Typically, the times of reception are communicated from mobile device 108 to PDE 116 via a respective base station 102 and a mobile switching center 208.

The PDE 116 may include a base station almanac (BSA) server 118, which provides the location of the base stations 102, the coverage area of base stations 102, and other relevant characteristics of the base stations 102. Alternatively, the PDE 116 and the BSA server 118 may be separate from each other, and the PDE 116 communicates with the base station 102 to obtain the base station information for position determination.

All base stations 102 have the same pilot waveform and are distinguished from one another by the PN phase offset of the pilot signal. In some systems, pilot PN phase offsets are typically assigned to stations in multiples of 64 chips, giving a total of 512 possible assignments. The Pilot Offset is a number that identifies the pilot phase assignment. Different base stations are identified by different pilot PN phase offsets. Note that repeaters, such as repeater 104 (FIG. 1), without the capability of generating pseudo pilot signals have been utilized in conventional communication systems 200.

Referring again to FIG. 1, communication system 100 operates in a manner similar to communication system 200 in FIG. 2, but communication system 100 provides additional capability to determine the location of mobile device 108 even when mobile device 108 and/or repeater 104 are not in a location to detect communication signals from a sufficient number of physical base stations 102, 114A-C.

In FIG. 1, repeater 104 may be used to improve coverage of base station 102, thereby reducing dropped call rates and improving voice quality. Repeater 104 can also be used to extend coverage of base station 102. In particular, repeaters 104 can be used to provide coverage in building 110 when relatively weak signals from base stations 102 may not otherwise be received by mobile device 108 in building 110 or other venue where signals from base station 102 are difficult to receive.

Repeater 104 is configured with antennas and forward and reverse path amplifiers and filters to communicate with one or more base stations 102 and mobile devices 108. Mobile device 108 includes a processor, memory, and transceiver (transmitter/receiver) (not shown) capable of transmitting and receiving signals appropriate for communication with components in communication network 100 including repeater 104 and PDE 116.

One novel aspect of the invention pertains to defining pilot signals with PN phase offsets that identify non-physical base stations 112A-112E (collectively "112"). The non-physical base stations 112 do not physically exist, but are assigned a unique PN phase offset that relate to the distance from non-physical base stations 112 to repeater 104 or other location such as the location of building 110 or other venue being served by the repeater 104. The information regarding the non-physical base stations 112 may be stored in BSA server 118 or other suitable location. In some aspects, BSA 118 is configured with unique PN phase offsets for the non-physical base stations 112, in addition to PN phase offsets for physical base stations 102, 114A-114C (collectively "114").

Mobile device 108 does not distinguish between physical base stations 102, 114 and non-physical base stations 112. Mobile device 108 therefore measures PN phase offset times of reception of different pilot phase signals from non-physical base stations 112, base stations 114 outside the reception range of repeater 104 and/or mobile device 108, as well as from physical base stations 102 within reception range of repeater 104 and/or mobile device 108, and reports them to position determination entity (PDE) 116. The timing data along with the base station location information contained in BSA server 118 may then be used to compute the position of the mobile device 108. Note that other suitable devices other than PDE 116 can be used to determine the locations of mobile device 108, such as the mobile device 108 itself, if the PN phase offset and corresponding location information for the physical base stations 102, 114 and/or non-physical base stations 112 are available to the mobile device 108.

In some aspects of the invention, SPTC circuit 106 generates a sufficient number of pseudo pilot signals that correspond to pseudo base stations 112, 114. The pilot PN phase offsets are adjusted such that the trilateration solution determined by PDE 116 yields the building 110 where the coverage is being provided by repeater 104. The generated pseudo pilots can be added to the normal communication pilots from base station 102. The pseudo pilots typically have a power level that will not trigger handoff.

In other aspects, the location of one or more pseudo base stations 112, 114 can be defined at an altitude above or below building 110 to enable the trilateration process to determine the building level or floor where mobile device 108 is located. Accordingly, any emergency response or information that is based on the location of mobile device 108 may be more timely, relevant, and/or accurate when a more precise location for mobile device 108 can be determined.

During operation, repeater 104 or other suitable device adds a pseudo pilot to other signals that pass through the repeater 104. A characteristic of the pseudo pilot signal is used to identify the origin of the pseudo pilot signal. The following description is given in the context of a CDMA network in which the characteristic of the pseudo pilot signal that is used to identify the pseudo pilot signal is the PN phase offset. However, it will be understood by those skilled in the art that the characteristic of the pseudo pilot signal discussed below may alternatively be a scrambling code as might be the case in a UMTS cellular network or any other signal characteristic used to identify the base station from which the pilot signal originates. Additionally, pseudo pilot signals can be used with dual-mode mobile devices 108. Dual-mode mobile devices 108 include both cellular and non-cellular radios for voice and data communication. Some types of dual mode phones use cellular radio which operate with GSM/CDMA/W-CDMA technology as well as other technology like IEEE 802.11 (Wi-Fi) radio or DECT (Digital Enhanced Cordless Telecommunications) radio. These phones can be used as cellular phones when connected to a wide area cellular network. When within range of a suitable WiFi or DECT network, the phone can be used as a WiFi/DECT phone for all communications purposes. Accordingly, even when operating in Wi-Fi or DECT mode, the CDMA portion of a dual-mode mobile device 108 can generate the pilot measurement report. The report can be sent to the PDE 116 via a WiFi or DECT data call.

Note that in some implementations, a pilot generator module that is at least capable of generating the pseudo pilot signals and combining the pseudo pilot signals with the communication signals from a base station 102 to form a composite signal that is sent to a mobile device 108 can be used instead of repeater 104.

As shown in FIG. 1, base station 102 communicates with repeater 104 via antennas 120, 122. The repeater 104 includes a first amplifier 124, a variable gain amplifier 126, a summing circuit 130, a third amplifier 132, a coupler 134 in addition to SPTC circuit 106. Signals received by the antenna 122 are input to the first amplifier 124. Note that the number and types of amplifiers that are identified herein are identified as such only for the purpose of exemplifying the circuitry of the repeater 104. Accordingly, more or less amplification may be used in the repeater 104. Furthermore, the placement of the amplifiers within the repeater 104 is shown only for the purpose of providing an example of one implementation of the repeater 104. Accordingly, amplification stages may be placed at any point in the repeater circuit as desired to achieve an appropriate noise figure and gain condition.

In the example shown in FIG. 1, the output of the first amplifier 124 is input to variable gain amplifier 126. The gain of the variable gain amplifier 126 is controlled by the SPTC circuit 106 in response to feedback provided by output from coupler 134. However, some implementations of repeater 104 may not include variable gain amplifier 126 and other amplifiers 124, 132, if used, may be fixed gain.

The output of the variable gain amplifier 126 is input to summing circuit 130. A second input to the summing circuit 130 is a pseudo pilot signal generated by SPTC circuit 106. The pseudo pilots need not all be of the same signal strength, nor always less than the pilot signal being repeated. Further information about the pseudo pilot signals is provided herein.

The output of the summing circuit 130 includes the composite of the two signals provided at the two inputs to the summing circuit 130. This composite signal is coupled to the input of the third amplifier 132. The output of third amplifier 132 is input to coupler 134. Coupler 134 provides one portion of the composite signal to the SPTC circuit 106 and the other portion of the composite signal to antenna 136 for transmission to a mobile device 108, such as a mobile cellular phone or a laptop computer. It should be noted that both portions of the composite signal have the same content, but may vary in power level. Accordingly, mobile device 108 receives the composite signal comprising both the signal originally transmitted by the base station 102 and the pseudo pilot signal generated by the SPTC circuit 106 in the repeater 104.

SPTC circuit 106 performs a first function of controlling the gain of the output signal being transmitted by repeater 104 on the forward link to the mobile device 108. The gain may be controlled by setting a gain factor in variable gain amplifier 126 that corresponds to a desired output level and ensuring that the input to SPTC circuit 106 from coupler 134 is consistently within a desired power range. If the power level is lower than desired, then the SPTC circuit 106 can command the variable gain amplifier 126 to increase the gain, thus boosting the output from the coupler 134. Conversely, if the power level from the coupler output is too high, then the SPTC circuit 106 will command the variable gain amplifier 126 to reduce its gain, thus reducing the power of the signal being output by the coupler 134 to both the antenna 136 and to the SPTC circuit 106. It should be noted that controlling the gain of the variable gain amplifier 126 can also be used to set the relative gain of the pseudo pilot signal with respect to the signals from base station 102 received by repeater 104.

Another function of the SPTC circuit 106 is to generate multiple pseudo pilot signals. It will be noted by those skilled in the art that the term "pseudo pilot signal" is used here to refer to any signal that is: 1) summed with the forward link signal transmitted by base station 102; and 2) generated using the same technique that is used to generate signals that identify base station 102. In addition, pseudo pilot signals generated by the SPTC circuit 106 are preferably unique from all pilot signals generated by base stations 102 in the local area whose transmissions might be received by mobile devices 108 receiving signals transmitted by repeater 104. However, in accordance with one implementation, different repeaters 104 in the communication system 100 will generate pseudo pilot signals with offsets that identify particular pseudo base stations 112, 114. The locations of the pseudo base stations 112, 114 are typically chosen so that trilateration techniques may be used to determine the location of repeater 104 in building 110. In further implementations where the location of at least one pseudo base station 112, 114 is defined at the top of or above building 110, a fourth pilot signal may be used to determine the floor in building 110 corresponding to the position of mobile device 108.

Note that when repeater 104 is receiving one or more signals from base stations 102, repeater 104 can be configured to generate only as many additional pseudo pilot signals as needed to supply a sufficient number of pilot signals for trilateration. For example, if repeater 104 is receiving signals from one base station 102, repeater 104 may provide two or three pseudo pilot signals, depending on whether the latitude and longitude as well as the height of the mobile device 108 is being determined.

In addition to generating the pseudo pilot signals, SPTC circuit 106 determines the appropriate power relationship between the repeated signal received by the repeater through the antenna 122 and the pseudo pilot signal. It should also be noted that some repeaters 104 will receive signals from multiple base stations 102. Accordingly, the distance between each base station 102, 114, non-physical base station 112, and the repeater 104 will be fixed and a function of the location of the repeater 104. Therefore, when the signals are received by the mobile device 108 and measurements are sent to the PDE 116, the location of the repeater 104 can be determined based on the measurements associated with each base station 102, 114 and non-physical base station 112. Note also that the pseudo Pilots generated by the SPTC can be adjusted to cause the trilateration solution to be a particular location within the building 110 or other venue.

The signal transmitted by the repeater 104 through the antenna 136 is received by mobile device 108. Once received, mobile device 108 operates in conventional fashion by identifying the pilot signals received, including pseudo pilot signals generated by SPTC circuit 106. Mobile device 108 reports all of the control and pilot signals received and their respective signal strengths. In accordance with one implementation of the presently disclosed method and apparatus, the report is sent via base station 102 to PDE 116 in a conventional pilot signal strength report, as defined, for example, in TIA standard IS-801, which governs the communications between a mobile device and a PDE in a CDMA cellular network.

Figure 3A:
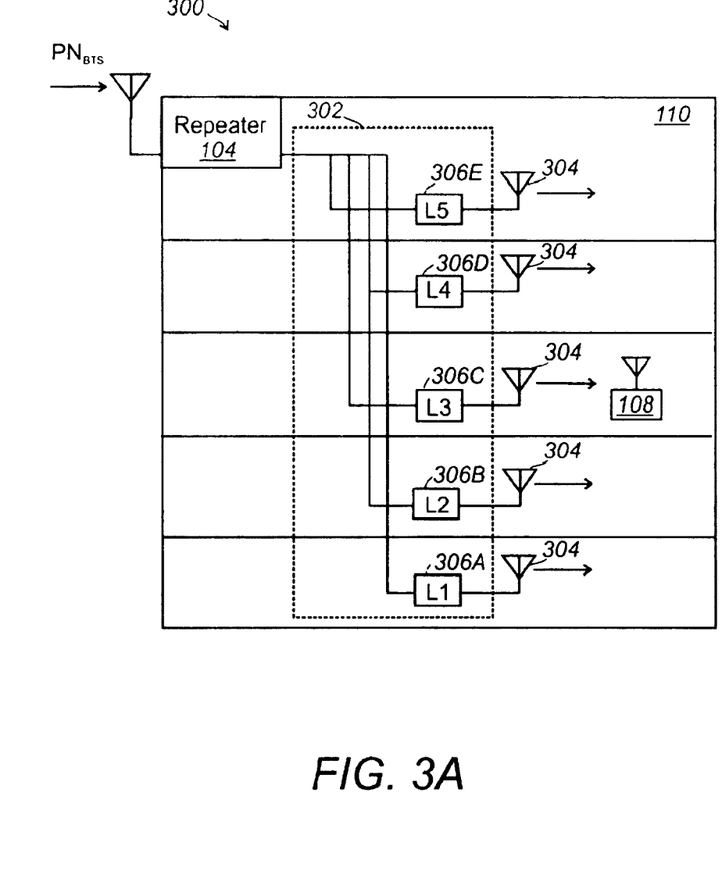
FIG. 3A is a block diagram of communication system including a repeater coupled to distributed antenna system.

Referring to FIG. 3A, communication system 300 is shown including repeater 104 coupled to distributed antenna system (DAS) 302 in building 110. DAS 302 includes a plurality of antenna nodes 304 positioned at different floors or levels (shown as L1-L5, for example) of building 110. Antenna nodes 304 are connected to a common source from repeater 104 via a transport medium that provides wireless service within a respective portion of building 110. In the embodiment shown, each antenna node 304 provides coverage for a floor of building 110, however, the coverage of antenna nodes 304 can be configured to cover different horizontal and/or vertical sectors of building 304. DAS 302 is typically installed to split the power of signals transmitted by repeater 104 among antenna elements 304 that are separated in space so as to provide coverage over the same area as a single antenna but with reduced total power and improved reliability. A single antenna at repeater 104 radiating at high power is replaced by a group of low-power antennas 304 to cover the same area.

DAS 302 can be implemented with pilot modification module 306 that modifies the pilot signal to include information such as the level, floor, sector, or other relevant information based on the location of corresponding antenna node 304. For example, on level 3 of building 110, pilot modification modules 306A-306E (collectively "306") can be configured to receive the pilot signal from repeater 104, modify the pilot signal to include information indicating that the pilot signal is being broadcast on level 3 (L3) of building 110, and broadcast the modified pilot signal within the corresponding coverage area. Mobile device 108 on level 3 of building 110 receives the modified pilot signal from the L3 modification module 306C and includes the modified pilot signal in the IS-801 Pilot Report or other suitable measurement report. PDE 116 (FIG. 1) correlates the modified pilot signal to level L3 of the building 110. Thus, PDE 116 is able to determine a more accurate location for mobile device 108 within building 110, specifically the area covered by respective antenna node 304 on level L3. Note that the capability to determine a more accurate location of mobile device 108 in building 110 using DAS 302 and pilot modification modules 306 can be utilized in addition to, or instead of, the capability of determining the vertical location of mobile device 108 using pilot signals corresponding to four pseudo base stations 112, 114 where one of the pseudo base stations 112, 114 is higher or lower in elevation than the mobile device 108, as further described herein.

Figure 3B:
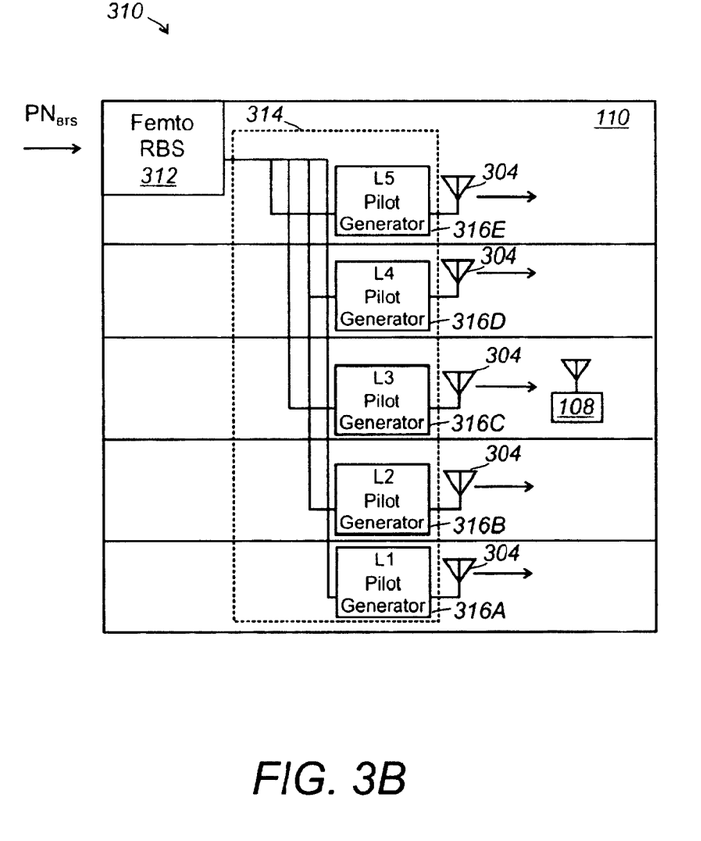
FIG. 3B is a block diagram of another communication system including femto radio base station coupled to a plurality of pilot generator modules.

Referring to FIG. 3B, another embodiment of communication system 310 is shown including femto radio base station (RBS) 312 coupled to pilot generator modules 316A-316E (collectively "316"). As used herein, a femto RBS 312 also has the meaning of a pico radio base station or a micro radio base station, which serves a femto cell (or pico cell or micro cell) such as building 110. Mobile device 108 communicates with femto RBS 312 over a radio or air interface. Pico and femto cell systems are individual radios that have very low output power, limited capacity, and are designed for small spaces like apartments or houses, while pico cells can typically cover enterprises with large buildings, for example, buildings up to 30,000 square feet. Femto RBS 312 behaves like a Wi-Fi access point and can connect to an IP network for backhaul transport. Femto RBS 312 uses a base station controller (not shown) to manage the flow of traffic out to each femto/pico cell and back, from an in-building network to a broader carrier network.

Pilot generator modules 316 are positioned at different floors or levels (shown as L1-L5, for example) of building 110. Antenna nodes 304 are connected to a common source from femto RBS 312 via a transport medium that provides wireless service within a respective portion of building 110. In the embodiment shown, each antenna node 304 provides coverage for a floor of building 110, however, the coverage of antenna nodes 304 can be configured to cover different horizontal and/or vertical sectors of building 110.

Pilot generator modules 316 generate the pseudo pilot signals, including information such as the level, floor, sector, or other relevant information based on the location of corresponding antenna node 304. For example, on level 3 of building 110, pilot generator module 316C can be configured to generate pilot signals that include information indicating that the pilot signal is being broadcast on level 3 (L3) of building 110, and broadcast the pilot signals within the corresponding coverage area. Mobile device 108 on level 3 of building 110 receives the pilot signal from the L3 modification module 316C and includes the pilot signals in the IS-801 Pilot Report. PDE 116 (FIG. 1) correlates the pilot signals to level L3 of the building 110. Thus, PDE 116 is able to determine a more accurate location for mobile device 108 within building 110, specifically the area covered by respective antenna nodes 304 on each level L1-L5.

Figure 3C:
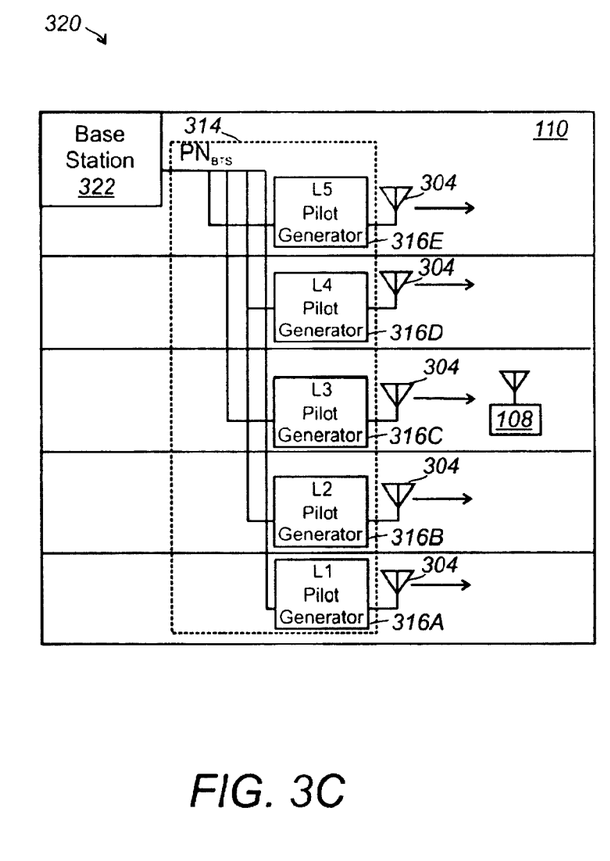
FIG. 3C is a block diagram of another communication system including a base station coupled to a plurality of pilot generator modules.

Referring to FIG. 3C, another embodiment of communication system 320 is shown including base station 322 coupled to pilot generator modules 316A-316E (collectively "316"). Mobile device 108 communicates with base station 322 over a radio or air interface. Base station 322 provides a wireless local area network access point.

Pilot generator modules 316 are positioned at different floors or levels (shown as L1-L5, for example) of building 110. Antenna nodes 304 are connected to a common source from base station 322 via a transport medium that provides wireless service within a respective portion of building 110. In the embodiment shown, each antenna node 304 provides coverage for a floor of building 110, however, the coverage of antenna nodes 304 can be configured to cover different horizontal and/or vertical sectors of building 110.

Pilot generator modules 316 generate the pseudo pilot signals, including information such as the level, floor, sector, or other relevant information based on the location of corresponding antenna node 304. For example, on level 3 of building 110, pilot generator module 316C can be configured to generate pilot signals that include information indicating that the pilot signal is being broadcast on level 3 (L3) of building 110, and broadcast the pilot signals within the corresponding coverage area. Mobile device 108 on level 3 of building 110 receives the pilot signal from the L3 modification module 316C and includes the pilot signals in the IS-801 Pilot Report. PDE 116 (FIG. 1) correlates the pilot signals to level L3 of the building 110. Thus, PDE 116 is able to determine a more accurate location for mobile device 108 within building 110, specifically the area covered by respective antenna nodes 304 on each level L1-L5.

Figure 4:
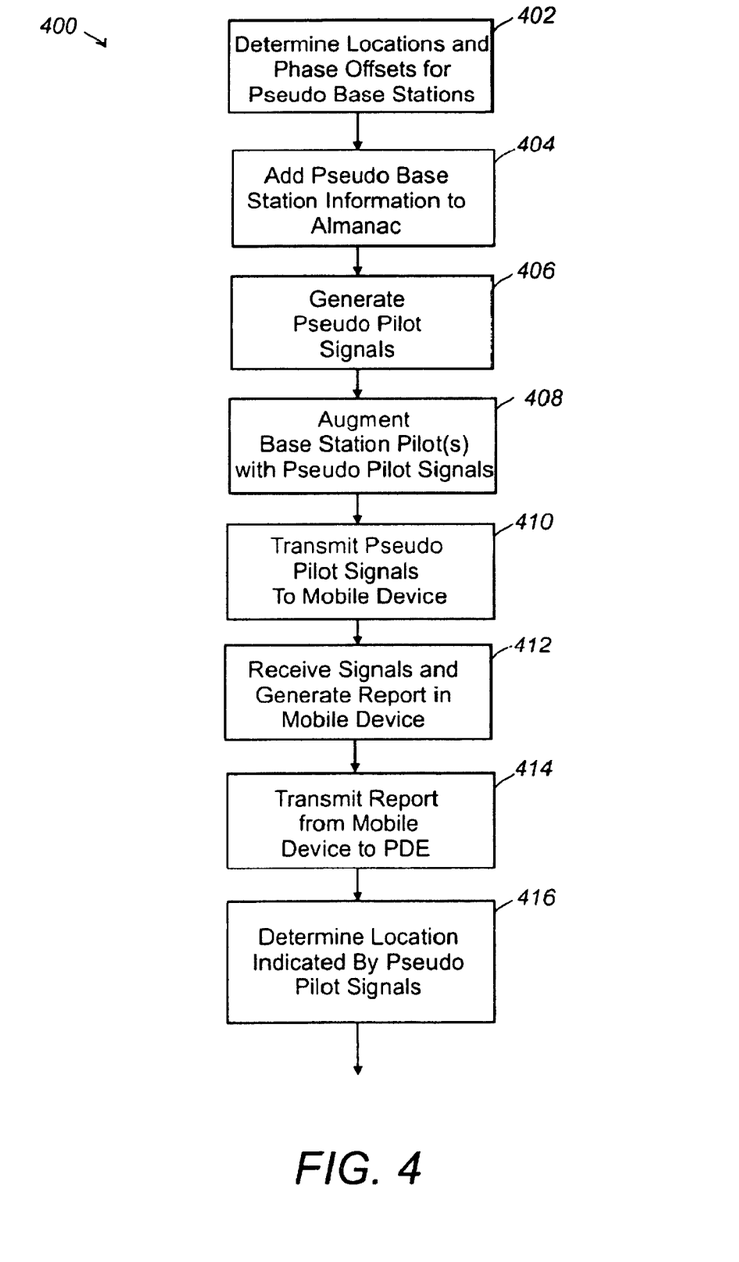
FIG. 4 shows a flow diagram of a process for determining the location of a mobile device.

Referring to FIG. 4, a flow diagram of a process 400 for determining the location of a mobile device is shown. Process 400 is particularly useful in locations where signals from base stations and satellite positioning systems are difficult to receive. In some instances, a repeater is used to extend the coverage of one or more base stations. For example, one or more repeaters can be installed in buildings located in congested areas. Interference from other buildings or environmental factors may block, distort, or weaken signals in at least one or more portions of the building. The repeater may be coupled to receive signals from an antenna that is positioned to communicate with the base station(s), such as on top of the building or other venue and re-broadcast the signals within the building or other venue. In other implementations, a femto radio base station or other suitable base station may be included in a building or other venue to provide coverage to mobile devices, thereby obviating the need for a repeater.

Process 402 includes determining "locations" of pseudo base stations. In some aspects, the pseudo base stations do not actually exist, but they are assigned a PN phase offset and corresponding location information. The locations may be defined relative to a repeater that is used where mobile devices have difficulty receiving signals from actual base stations, such as a large building in a congested area or a building that is fabricated with materials that distort or weaken the signals.

In further aspects, process 402 can select some or all of the PN phase offsets corresponding to physical base stations 114 (FIG. 1) that are not in communication with the repeater or with mobile device(s) in the vicinity of the repeater. The locations of base stations 114 are known by the PDE 116. Accordingly, the correct PN phase offsets can be generated such that the trilateration solution points to the location of the mobile device. The technique of using pilot signals with PN phase offset corresponding to base stations 114 is similar to using pseudo pilot signals from non-physical base stations 112 but may be easier to implement since the PDE 116 already knows the locations of base stations 114 and the mobile device will already be searching for neighboring base stations.

Process 404 includes adding the information such as the PN phase offsets and location information to an almanac where similar information for other base stations may be stored. The almanac can be co-located with positioning determining equipment (PDE) and accessed during trilateration processes to determine the location of the mobile device.

Process 406 includes generating a sufficient number of pseudo pilot signals. The pseudo pilot signals are generated to include a PN phase offset that corresponds to one of the pseudo base stations and the path length, which corresponds to the desired AFLT location. Typically, three pseudo pilot signals are generated and broadcast to the mobile device. In other implementations, the height of the mobile device can be determined when four pseudo pilot signals are generated and one of the pseudo pilot signals corresponds to a pseudo base station that is above or below the location of the mobile device. Note that process 406 can generate other suitable numbers of pilot signals.

Process 408 includes augmenting communication signals from a base station with the pseudo pilot signals generated in process 406. The power level of the pseudo pilot signals is low enough to avoid triggering a handoff to the base stations represented by the pseudo pilot signals.

Process 410 includes transmitting signals composed of the base station signals augmented with the pseudo pilot signals to the mobile device. When the mobile device receives the composite signals in process 412, the mobile device makes pilot phase measurements on the base stations/pseudo base stations and reports them to a base station in process 414. The base station transmits the report to position determining equipment to supply the measurements required for trilateration. In some implementations, the known IS-801 or other suitable protocol is used to transmit the report from the mobile device to the position determining equipment via a base station.

Process 416 includes determining the location of the building or other venue indicated by the pseudo pilot signals. In implementations where a fourth pseudo pilot signal is generated that corresponds to a pseudo base station positioned above (or below) the mobile device, the height of the mobile device may be determined along with the physical location. The height may be further translated to a floor or other sector within the building to further narrow the location of the mobile device.

Figure 5:
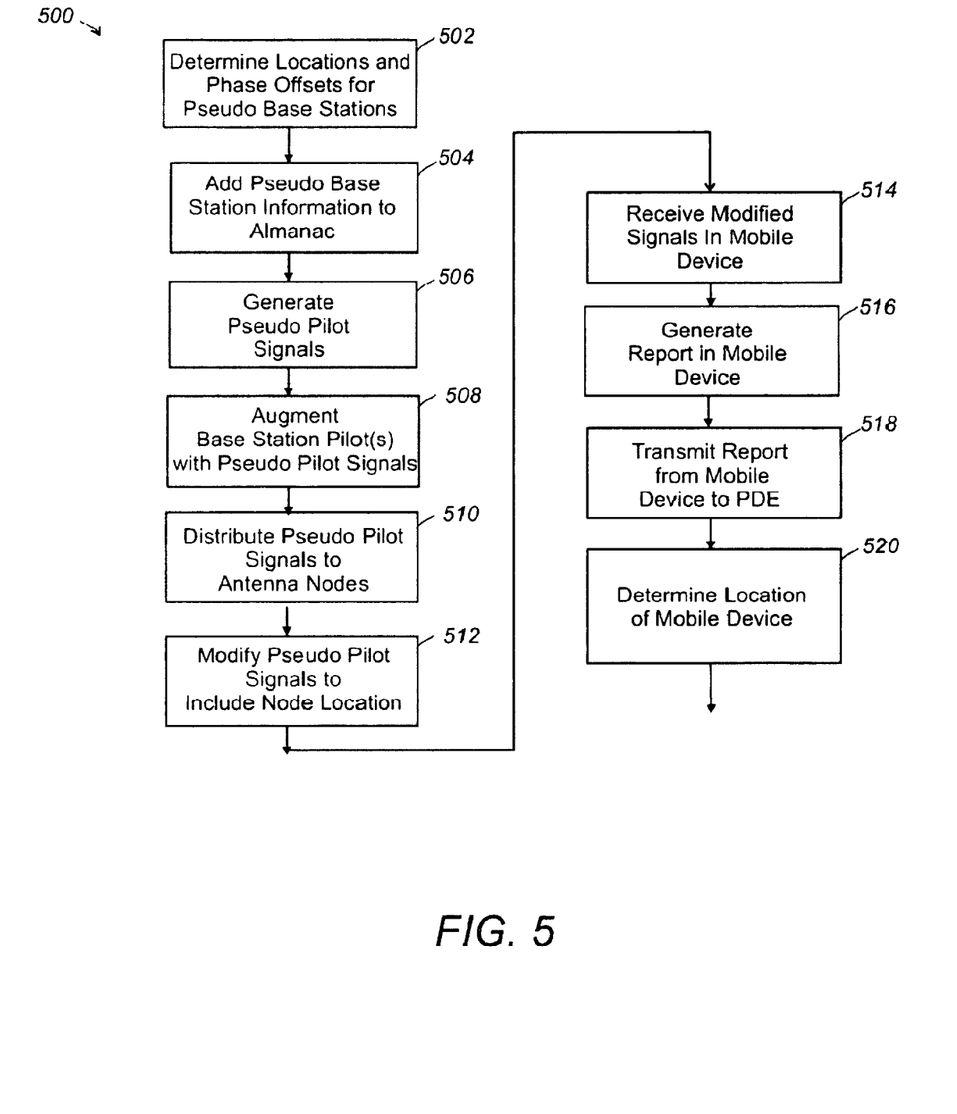
FIG. 5 shows a flow diagram of a process for determining the location of a mobile device using a distributed antenna system.

Referring to FIG. 5, a flow diagram of another process 500 for determining the location of a mobile device using a distributed antenna system (DAS) 302 (FIG. 3A) is shown. Process 502 includes determining "locations" of pseudo base stations. In some aspects, the pseudo base stations do not actually exist, but they are assigned a PN phase offset and corresponding location information. The locations may be defined where mobile devices have difficulty receiving signals from actual base stations, such as a large building in a congested area or a building that is fabricated with materials that distort or weaken the signals.

In further aspects, process 502 can select some or all of the PN phase offsets corresponding to physical base stations 114 (FIG. 1) that are not in communication with a repeater or with mobile device(s). The locations of base stations 114 are known by the PDE 116. Accordingly, the correct PN phase offsets can be synthesized by a pilot generator module such that the trilateration solution points to the area where the mobile device is operating. The technique of using pilot signals with PN phase offset corresponding to base stations 114 is similar to using pseudo pilot signals from non-physical base stations 112 but may be easier to implement since the PDE 116 already knows the locations of base stations 114 and the mobile device will already be searching for neighboring base stations.

Process 504 includes adding the information such as the PN phase offsets and location information to an almanac where similar information for other base stations may be stored. The almanac can be co-located with positioning determining equipment (PDE) and accessed during trilateration processes to determine the location of the repeater from which the mobile device is receiving signals.

Process 506 includes generating the pseudo pilot signals. The pseudo pilot signals include a PN phase offset that corresponds to one of the pseudo base stations. Typically, three pseudo pilot signals are generated, however four pseudo signals may be generated to determine the height of the mobile device. Other suitable numbers of pseudo pilot signals can be used. In some implementations, one or more the pseudo pilot signals may correspond to a physical base station that is outside the reception range of the mobile device and the repeater. Process 508 includes augmenting signals from a base station with the pseudo pilot signals generated in process 506. The power level of the pseudo pilot signals is low enough to avoid triggering a handoff to another base station.

Process 510 includes transmitting signals composed of the base station signals augmented with the pseudo pilot signals to antenna nodes associated with a distributed antenna system in a building or other venue. Process 512 includes modifying the pseudo pilot signals from the repeater to include the location of the antenna node. The location of the antenna node may correspond to a floor or other segment of a building or other venue, depending on how the coverage for each antenna node is configured. The modified pilot signals are then broadcast by the antenna nodes.

Process 514 includes receiving the modified pseudo pilot signals in the mobile device. The mobile device makes pilot phase measurements on the base stations/pseudo base stations and generates a report in process 516. In process 518, the base station transmits the report to position determining equipment to supply the measurements required for trilateration. In some implementations, the IS-801 or other suitable protocol is used to transmit the report from the mobile device to the position determining equipment via a base station.

Process 520 includes determining the location of the building or other venue indicated by the modified pseudo pilot signals. The PDE can be configured to decode the information specific to the antenna node that broadcast the signal received by the mobile device. The antenna node information may be translated to a floor or other sector within the building to further narrow the location of the mobile device.

In some implementations, the mobile device has access to the almanac information such as PN phase offset and position information for the building or other venue, base stations communicating with a repeater in the building, and/or the pseudo base stations. The mobile device can therefore determine the position of the mobile device using the information in the almanac without transmitting information to a position determining entity.

Those of skill in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the program code is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile device, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method comprising:
generating a plurality of pseudo pilot signals corresponding to pseudo base stations, the pseudo base stations being at least one selected from the group consisting of: (1) a plurality of non-physical base stations, and (2) physical base stations outside a reception range of a repeater and a wireless mobile device in a vicinity of the repeater, wherein
each pseudo pilot signal of the plurality of pseudo pilot signals includes a pseudonoise chase offset that corresponds to a distance between the corresponding pseudo base station and the repeater;
combining the pseudo pilot signals with communication signals from a physical base station that is within the reception range of the repeater to form composite signals; and
transmitting, by the repeater, the composite signals for reception by the wireless mobile device.

2. The method of claim 1, further comprising adjusting a relative power of the pseudo pilot signals with respect to the communication signals received from the physical base station to avoid triggering a handoff to the pseudo base stations.

3. The method of claim 1, further comprising adding the PN phase offsets and location information for the pseudo base stations to an almanac that is accessible by an automated position determining entity.

4. The method of claim 1, wherein the pseudo pilot signals correspond to a number of different pseudo base stations, the number of different pseudo base stations is determined such that sufficient pseudo pilot signals for trilateration are generated, and the PN phase offsets are utilized in a trilateration process to determine a location of the wireless mobile device.

5. The method of claim 1, wherein the pseudo pilot signals correspond to a number of different pseudo base stations, the number of different pseudo base stations is determined such that sufficient pseudo pilot signals for trilateration are generated, and one of the pseudo pilot signals corresponds to a pseudo base station that is above or below a location of the wireless mobile device, the method further comprising determining a height of the mobile device.

6. The method of claim 1, wherein the pseudo pilot signals are generated by the repeater.

7. The method of claim 1, wherein the pseudo pilot signals are combined with the communication signals.

8. The method of claim 1, further comprising:
generating a report of measurements based on the composite signals; and
determining a location of the wireless mobile device based on the PN phase offsets.

9. The method of claim 8, wherein the report is received in a position determining entity and a location of the wireless mobile device is determined by the position determining entity.

10. The method of claim 1, further comprising:
transmitting the composite signals to antenna nodes associated with a distributed antenna system;
modifying the composite signals to identify an antenna node of the antenna nodes receiving the composite signal; and
transmitting the modified composite signal to the mobile device.

11. The method of claim 10, further comprising:
determining a more specific location of the wireless mobile device based on the modified composite signals.

12. A system comprising:
a pilot generator circuit configured to communicate with a mobile device in a building or other venue; and
the pilot generator circuit is operable to generate pseudo pilot signals and transmit composite signals to the mobile device, wherein:
the pseudo pilot signals correspond to respective pseudo base stations being at least one selected from the group consisting of: (1) non-physical base stations, and (2) physical base stations outside an operation vicinity of the mobile device;
each pseudo pilot signal includes a PN phase offset that corresponds to a distance between the corresponding pseudo base station and the pilot generator circuit; and
the pseudo pilot signals are combined with communication signals from a physical base station that are within the reception range of the pilot generator circuit to form the composite signals.

13. The system of claim 12, further comprising:
a location of one of the pseudo base stations is defined above or below the building to enable a trilateration process to determine a building level where the mobile device is located.

14. The system of claim 13, further comprising:
a distributed antenna system in communication with the pilot generator circuit and including a plurality of antenna nodes distributed throughout the building, the distributed antenna system further including a modifier circuit operable to:
modify the pseudo pilot signals to identify each antenna node of the plurality of antenna nodes receiving the pseudo pilot signals; and
transmit the modified pseudo pilot signals from each antenna node of the plurality of antenna nodes to the mobile device.

15. The system of claim 13, further comprising:
a summing circuit operable to combine the pseudo pilot signals with signals received from a physical base station to generate a composite signal.

16. The system of claim 15, further comprising:
an antenna coupled to transmit the composite signal to the mobile device.

17. A computer program product comprising:
non-transitory computer-readable medium comprising:
code operable to cause at least one computer to:
generate a series of pseudo pilot signals corresponding to a plurality of different pseudo base stations, wherein:
each pseudo pilot signal of the series of pseudo pilot signals includes a PN phase offset that corresponds to a distance to a pseudo base station of the plurality of different pseudo base stations,
locations of the pseudo base stations being selected to enable trilateration techniques to be used to determine a location of a wireless mobile device that receives the pseudo pilot signals, and
the pseudo base stations being at least one selected from the group consisting of: (1) a plurality of non-physical base stations, and (2) physical base stations outside a reception range of the mobile device;
combine the pseudo pilot signals with communication signals from a physical base station to form a series of composite signals; and
output the composite signals for transmission to a wireless mobile device.

18. The computer program product of claim 17, further comprising:
code operable to cause at least one computer to:
modify the composite signals to indicate an antenna node in a distributed antenna system receiving the composite signals; and
output the modified composite signals for transmission from the antenna node to the wireless mobile device.

19. A mobile device comprising:
a processor;
a computer-readable medium comprising:
code operable to cause the processor to:
receive a series of composite signals from a repeater corresponding to a plurality of pseudo base stations, the pseudo base stations being at least one selected from the group consisting of: (1) a plurality of non-physical base stations, and (2) physical base stations outside a reception range of the mobile device, wherein
pseudo pilot signals including a PN phase offset, that corresponds to a distance to a pseudo base station of the plurality of pseudo base stations and the repeater, are combined with communication signals from a physical base station that is within the reception range of the repeater to form the composite signals, determine identities and locations of the pseudo base stations based on the PN phase offsets; and
determine a location of the mobile device based on the locations of the pseudo base stations.

20. The mobile device of claim 19, further comprising:
a computer-readable almanac of information pertaining to the locations and identifiers for the plurality of base stations and pseudo base stations.

21. The mobile device of claim 19, further comprising:
code for causing the processor to: determine a refined location of the mobile device in a geographic vicinity corresponding to an antenna node in a distributed antenna system in the geographic vicinity.

22. The mobile device of claim 19, wherein:
code for causing the processor to:
determine a refined location of the mobile device in a geographic vicinity based on another PN phase offset corresponding to a fourth pseudo base station.

23. An apparatus comprising:
means for generating pseudo pilot signals, wherein each pseudo pilot signal includes a PN phase offset that corresponds to a distance to a corresponding pseudo base station;
means for combining the pseudo pilot signals with communication signals from a physical base station that is within the reception range of a repeater to form composite signals; and
means for transmitting the composite signals to a mobile device, wherein the pseudo base stations being at least one selected from the group consisting of: (1) non-physical base stations, and (2) physical base stations outside an operational vicinity of the mobile device.

24. The apparatus of claim 23, further comprising:
a location of one of the pseudo base stations is defined above or below a building to enable a trilateration process to determine a building level where the mobile device is located.

25. The apparatus of claim 23, further comprising:
distributed antenna means for communicating with the means for generating pseudo pilot signals and including a plurality of antenna nodes distributed throughout a building, the distributed antenna means further including: means for modifying the pseudo pilot signals to identify each antenna node of the plurality of antenna nodes receiving the pseudo pilot signals; and
means for transmitting the modified pseudo pilot signals from each antenna node of the plurality of antenna nodes to the mobile device.

26. The apparatus of claim 23, further comprising:
means for combining the pseudo pilot signals with signals received from a physical base station to generate a composite signal.

* * * * *